United States Patent
King et al.

(10) Patent No.: US 7,929,533 B2
(45) Date of Patent: Apr. 19, 2011

(54) SYSTEM FOR SELECTING A CONNECTIVITY MECHANISM

(75) Inventors: John R. King, Woodbridge (GB); Peter Hovell, Woodbridge (GB); John Patterson, Ipswich (GB)

(73) Assignee: British Telecommunications plc, London (GB)

( * ) Notice: Subject to any disclaimer, the term of this patent is extended or adjusted under 35 U.S.C. 154(b) by 1813 days.

(21) Appl. No.: 10/508,123

(22) PCT Filed: Mar. 24, 2003

(86) PCT No.: PCT/GB03/01256
§ 371 (c)(1),
(2), (4) Date: Sep. 16, 2004

(87) PCT Pub. No.: WO03/084185
PCT Pub. Date: Oct. 9, 2003

(65) Prior Publication Data
US 2005/0182829 A1 Aug. 18, 2005

(30) Foreign Application Priority Data
Mar. 27, 2002 (EP) .................................. 02252222

(51) Int. Cl.
*H04L 12/56* (2006.01)
(52) U.S. Cl. .......................... 370/392; 370/466; 709/245
(58) Field of Classification Search .................. 370/392, 370/401, 466–467; 709/245, 246
See application file for complete search history.

(56) References Cited

U.S. PATENT DOCUMENTS

| 6,609,167 | B1 * | 8/2003 | Bastiani et al. ............... 710/104 |
| 6,618,788 | B1 * | 9/2003 | Jacobs ........................... 710/315 |
| 6,697,885 | B1 * | 2/2004 | Goodfellow .................... 710/22 |
| 6,912,219 | B2 * | 6/2005 | Tsuchiya et al. .............. 370/392 |
| 7,028,100 | B2 * | 4/2006 | Furukawa et al. ............. 709/245 |
| 7,054,944 | B2 * | 5/2006 | Tang et al. ..................... 709/229 |
| 7,188,191 | B1 * | 3/2007 | Hovell et al. .................. 709/245 |
| 7,231,452 | B2 * | 6/2007 | Ananda et al. ................. 709/230 |
| 7,290,064 | B2 * | 10/2007 | Patel et al. ..................... 709/250 |
| 2002/0038419 | A1 * | 3/2002 | Garrett et al. ................. 713/154 |
| 2002/0044567 | A1 * | 4/2002 | Voit et al. ...................... 370/467 |
| 2002/0150104 | A1 * | 10/2002 | Hamamoto et al. .......... 370/392 |
| 2002/0154624 | A1 * | 10/2002 | Oishi et al. .................... 370/350 |
| 2003/0088697 | A1 * | 5/2003 | Matsuhira ..................... 709/238 |
| 2003/0110292 | A1 * | 6/2003 | Takeda et al. ................. 709/245 |
| 2004/0205233 | A1 * | 10/2004 | Dunk ............................ 709/238 |
| 2008/0043762 | A1 * | 2/2008 | Hamamoto et al. .......... 370/401 |
| 2008/0056301 | A1 * | 3/2008 | Higuchi et al. ............... 370/467 |

OTHER PUBLICATIONS

Tsirtsis et al., "Network Address Translation—Protocol Translation (NAT-PT)", RFC2766, Feb. 2000, XP002167711.
Bound et al., "Dual Stack Transition Mechanism (DSTM)", Internet-Draft, Feb. 2001, XP002206650.

(Continued)

*Primary Examiner* — William Trost, IV
*Assistant Examiner* — Roberta A Shand
(74) *Attorney, Agent, or Firm* — Nixon & Vanderhye PC (57) ABSTRACT

An address resolver system that assists a node in an IPv6 network to select an address for connectivity with a node in an IPv4 network when both DSTM and NAT-PT transition mechanisms are available. Native connectivity can be achieved by preferring an encapsulation or tunnelling mechanism such as DSTM where possible over a translation mechanism such as NAT-PT. A range of encapsulation and translation mechanisms are envisaged. The resolver determines capabilities of the node and of the application that requires the address in order to make the selection.

21 Claims, 6 Drawing Sheets

OTHER PUBLICATIONS

Afifi et al., "Methods for IPv4-IPv6 Transition", Proceedings IEEE International Symposium on Computers and Communications, XX, XX, pp. 478-484, XP002159749, Jun. 1999.

European Search Report, Dec. 2002.
International Search Report, Jul. 2003.
Ukerna News 17, Nov. 2001, pp. 1-25.

* cited by examiner

HOST TRANSPORT
CAPABILITY

|  | IPv4 | IPv6 | DSTM |
|---|---|---|---|
| IPv4 | X | X | IPv4 |
| IPv6 | X | IPv6 | IPv6 |
| IPv4/v6 | X | IPv6 | IPv4 |

APPLICATION CAPABILITY

SYSTEM FOR SELECTING A CONNECTIVITY MECHANISM

This application is the US national phase of international application PCT/GB03/01256 filed 24 Mar. 2003 which designated the U.S. and claims benefit of EP 02252222.1, dated 27 Mar. 2002, the entire content of which is hereby incorporated by reference.

BACKGROUND

1. Technical Field

This invention relates to systems suitable for use in computer networks undergoing the transition from IPv4 to IPv6. Particularly but not only to a resolver system that assists a node in an IPv6 network to select an address for connectivity with a node in an IPv4 network when both DSTM and NAT-PT or similar transition mechanisms are available.

2. Related Art

A variety of transition mechanisms are proposed for migrating IP (Internet Protocol) networks from IPv4 to IPv6, including encapsulation or tunnelling systems such as DSTM (Dual Stack Transition Mechanism) and translation systems such as NAT-PT (Network Address Translation-Protocol Translation), SIIT (Stateless IP/ICMP Translator), BIS (Bump-in-the-Stack), BIA (Bump-in-the-API). DSTM allows a node in an IPv6 network to communicate with a node in an IPv4 network by allocating the IPv6 node a temporary IPv4 address. NAT-PT enables translation of IPv4 addresses and packets into equivalent IPv6 addresses and packets, and vice versa. Management of IP addresses is generally carried out by DNS (Domain Name System) servers. All have been described in documents published by the IETF (Internet Engineering Task Force).

A growing number of Internet nodes contain dual stack applications that are capable of packet communication with other nodes using both IPv4 and IPv6. Each node also contains a resolver that obtains one or more IP addresses for a remote node when required by a local application. The resolver generally determines a remote address by way of a request transmitted through one or more DNS servers, being an A request for a record containing an IPv4 address or an AAAA request for a record containing an IPv6 address. An A6 request might also be used in relation to IPv6 addresses although AAAA requests are more likely to be deployed in practice. The application will usually ask for both kinds of address, and the DNS response along with capabilities of the local node generally determines which address will be used. However, current methods for selection of the address do not always provide the most efficient connectivity been the nodes.

For example, an application in an IPv6 node requests both IPv4 and IPv6 addresses of a target IPv4 node through the local resolver and DNS. If the target is bounded from the source by both NAT-PT and DSTM, then the resolver may list both an IPv6 version of the target native IPv4 address, produced by translation, and the actual IPv4 address returned for activation of DSTM. The source node or application may not have a system for selecting from the list other than simply to choose the first address that is presented or to follow a default algorithm. If the first address is the IPv6 version then connectivity between the source and the target will be established using the translation mechanism. If the first address is the actual IPv4 address then connectivity will be set up with DSTM.

Translation mechanisms are "best effort" but may result in loss of service specific information. Encapsulation mechanisms are generally preferred because native connectivity is possible. In the example above, the IPv6 node will communicate with the IPv4 node using a mechanism determined arbitrarily by whichever DNS response is presented first to the application. The most suitable mechanism is not generally determined before a connection between the nodes is set up.

BRIEF SUMMARY

The exemplary embodiment provides for improved address selectin in IPv6 nodes that are able to communicate with IPv4 nodes by both DSTM and NAT-PT, or similar encapsulation and translation system, or at least to provide an alternative to existing selection mechanism. In general terms the address is selected in accord with capabilities of the IPv6 node and in a way that establishes native connectivity for communication with an IPv4 node if possible.

In one aspect the invention may broadly be said to consist in a method of selecting connectivity between a source node and a target node in an IP network, comprising: requesting at least one IP address for the target node, receiving two or more IP addresses for the target node, determining that one of the received addresses represents connectivity by encapsulation, determining that another of the received addresses represents connectivity by translation, and selecting the address that represents connectivity by encapsulation for communication between the nodes. Preferably the method also determines that the source node has a dual stack mechanism available and is capable of connectivity with IPv4 nodes by DSTM.

In another aspect the invention may be said to consist in a node in an IP network including: application layer components having different IP addressing capabilities for communication with components in other nodes, network layer components providing different IP addressing capabilities for the application layer components, and an address resolver component that determines the capabilities of both the application layer components and the network layer components, and selects IP addresses giving preference to encapsulation over translation wherever possible.

In another aspect the invention may be said to consist in an address selector for a node in an IP network, including: means for determining IP addressing capabilities of application and network layer components in the node, means for determining IP address characteristics of a remote node in the network with which the application components may communicate, means for determining a connectivity mechanism according to the capabilities of the components and characteristics of the remote node, and means for selecting addresses for the node and the remote node in order to optimise the connectivity mechanism.

In a further aspect the invention consists in a method of selecting connectivity at a node in an IP network, comprising: determining capability of the node for communication over the network by way of two or more connectivity mechanisms, obtaining two or more IP addresses for another node representing communication between nodes by way of at least two of the mechanisms, and selecting an address for each node and a mechanism for communication giving preference to encapsulation over translation where possible.

A node in this specification can be any device that implements IPv4 or IPv6 and is therefore capable of communicating with other devices over an IP based network either wired or wireless. It includes devices such as end user PCs (Personal Computers) and central servers, and anything commonly called an Internet host. Other terms in the specification are also to be interpreted broadly to include all equivalent devices and features.

BRIEF DESCRIPTION OF THE DRAWINGS

Preferred embodiments of the invention will be described with respect to the accompanying drawings, of which.

DETAILED DESCRIPTION OF PREFERRED EMBODIMENTS

Referring to the figures it will be appreciated that the invention can be implemented in a variety of ways on a variety of IPv6 nodes in the Internet or other computer network. This description is given by way of example only. Internet protocols and systems such as IPv4, IPv6, layer models, DNS, DSTM or other encapsulation mechanisms and NAT-PT or other translation mechanisms, will be understood by a skilled reader and need not be explained in detail.

Figure 1:
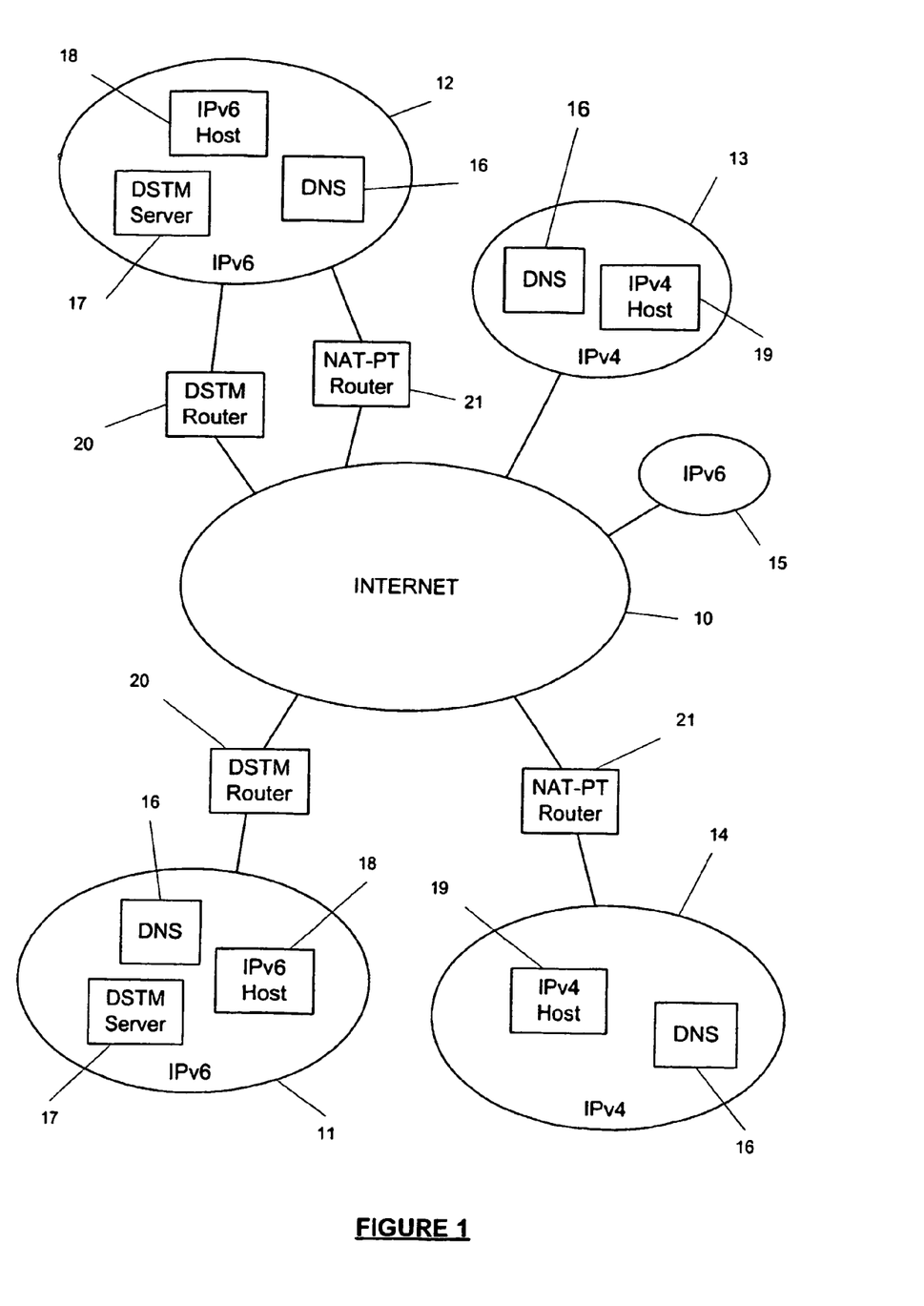
FIG. 1 shows a generalised network including IPv6 and IPv4 sub networks.

FIG. 1 schematically shows the Internet 10 with several sub networks 11, 12, 13, 14 and 15. Each network may itself be a complex combination of component networks or domains that may be connected to the Internet in a variety of ways. Each network also generally has at least one DNS server 16 that holds resource records including IP addresses for local nodes, and responds to requests by both local and remote nodes, as generally known. Network 11 is IPv6 and implements at least one IPv6/IPv4 transition mechanism, particularly but not only DSTM, to enable communication with IPv4 nodes elsewhere. Network 14 is IPv4 and implements NAT-PT to enable communication with IPv6 nodes elsewhere. Network 12 is IPv6 and implements both DSTM and NAT-PT. Networks 13 and 15 are IPv4 and IPv6 respectively without necessarily having any particular transition mechanism. Each IPv6 network has at least one IPv6 node 18 and each IPv4 network has at least one IPv4 node 19.

Each IPv6 network in FIG. 1 that implements DSTM generally requires a separate address server 17 to hold a pool of IPv4 addresses for assignment to local IPv6 nodes, and maintains a record of each mapping for the duration of sessions between local and remote nodes. A DSTM border router or gateway 20 is also generally required for connection of the network to the Internet and may also be able to cache address mappings, for example. Each IPv6 node 18 that uses DSTM in network 11 generally requires a DSTM application that manages temporary assignments of IPv4 addresses to the node, and also a DTI (Dynamic Tunnelling Interface) system that encapsulates and decapsulates IPv4 packets within IPv6 packets for transmission and reception within the local network.

Networks in FIG. 1 that implement NAT-PT generally require at least a border router or gateway 21 capable of translating IPv4 addresses and packets into IPv6 addresses and packets. DSTM and NAT-PT routers are shown separately for network 12 but may be combined in a single device. These NAT-PT systems are generally bidirectional and may hold a pool of IP addresses for assignment to local nodes as required. They may also track the duration of each session between local and remote nodes. More complex translation systems such as NAPT-PT (Network Address Port Translation-Protocol Translation) perhaps including ALG (Application Layer Gateway) and a range of other might also be implemented in the border router in some circumstances.

An IPv6 network in FIG. 1 may mix DSTM capable nodes that can temporarily be assigned an IPv4 address, and IPv6 only nodes that have no capability for temporary address allocation and must use a translator to communicate with IPv4 only nodes. Software applications in nodes of either type may have dual stack capability and thereby support both IPv6 and IPv4 communications. A typical dual stack application is likely to request both IPv6 and IPv4 addresses when attempting to communicate with a remote node. However, the application generally has no knowledge of the capabilities of the local IPv6 node and without control over DNS exchanges will not necessarily select a suitable address to establish the most efficient mechanism for connectivity. A typical DNS resolver in the IPv6 node will send both A and AAAA requests to the local DNS server and then return a list of possible addresses to the application, generally ordered according to their time of receipt.

Figure 2:
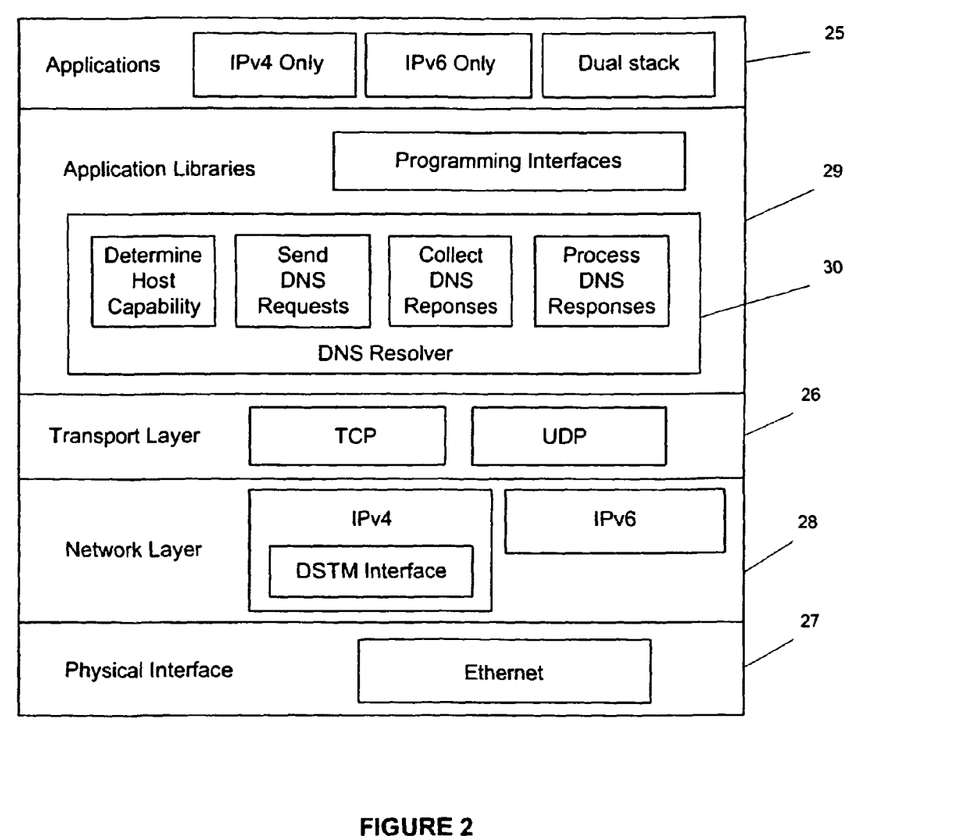
FIG. 2 shows component layers in a possible DSTM node according to the invention, FIG. 3 outlines how the DNS resolver in FIG. 2 may determine a list of addresses for an application in the node, FIG. 4 indicates how a dual stack application in a DSTM node may obtain both IPv6 and IPv4 addresses for a remote IPv4 node, FIG. 5 outlines how the DNS resolver in FIG. 2 may select connectivity with a remote node preferring encapsulation over translation.

FIG. 2 schematically indicates components of an IPv6 node system having DSTM capability and also a DNS resolver with address selection, such as node 18 in network 11 or 12 of FIG. 1. In this example the node has a range of IPv4, IPv6 and dual stack applications in an application layer 25, components for two common transport protocols TCP and UDP in a transport layer 26, and components for an Ethernet interface in a physical layer 27. Common applications provide virtual terminal (TELNET), file transfer (FTP) and email (SMTP) functions, for example, and may or may not be both IPv4 and IPv6 capable. Other applications, protocols and physical interfaces are also used in practice. Network layer 28 provides DSTM connectivity for the applications through IPv6 and IPv4 components, including a DTI system for encapsulation and decapsulation of IPv4 packets. In general terms, the network layer in an Internet node is responsible for creating and addressing IP packets, among other functions, and may or may not be both IPv4 and IPv6 capable.

The resolver system 30 in FIG. 2 is typically contained in a library 29 of components such as APIs (Application Programming Interfaces) that provide services to the applications. The resolver provides generally standard functions including sending and collecting DNS requests and responses, but also functions that are able to determine the node capability and process the DNS responses accordingly for address selection. A DSTM interface can be detected for example, by inspecting the Windows Registry on a Microsoft system, or through ifconfig dti0 on a Unix system. These functions of the resolver could be spread over several components in other layers if required.

Figure 3:
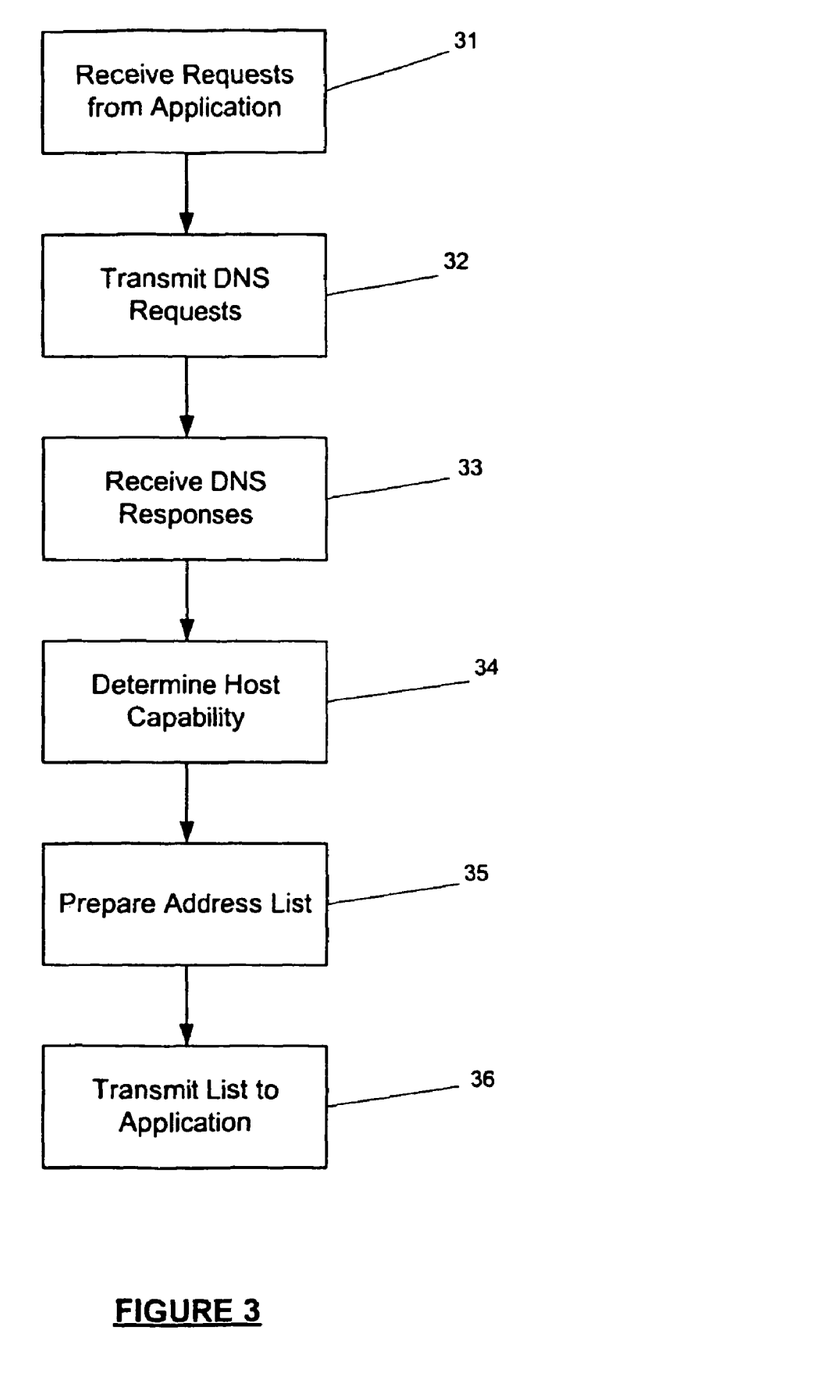

FIG. 3 indicates a process by which the resolver 30 in FIG. 2 may select addresses for an application from a collection of two or more IPv4 and IPv6 addresses generated by DNS exchanges and transition mechanisms. Address requests are received from the application in step 31 usually through an API such as getaddrinfo. DNS requests for resource records are then sent by the resolver in step 32, generally in any order depending on the order requests are received from the particular application. DNS responses are received in step 33 also in any order generally depending on the order in which corresponding requests were sent out, and usually limited by a time out period. Two or more addresses may be collected depending on details of the nodes and the various DNS exchange and transition mechanisms that are implemented by their networks. The resolver then determines transport capabilities of the node in step 34, detecting particularly whether a DSTM or other encapsulation interface is present and suitably configured. Alternatively, the node capabilities might be determined periodically or recorded when the resolver is set up. The configuration of an interface may change for various reasons and a fresh determination for each address request by an application is preferred. Characteristics of the DNS responses and the node capabilities are then used in step 35 to select and prepare a list of addresses that are transmitted to the application in step 36.

Figure 4:
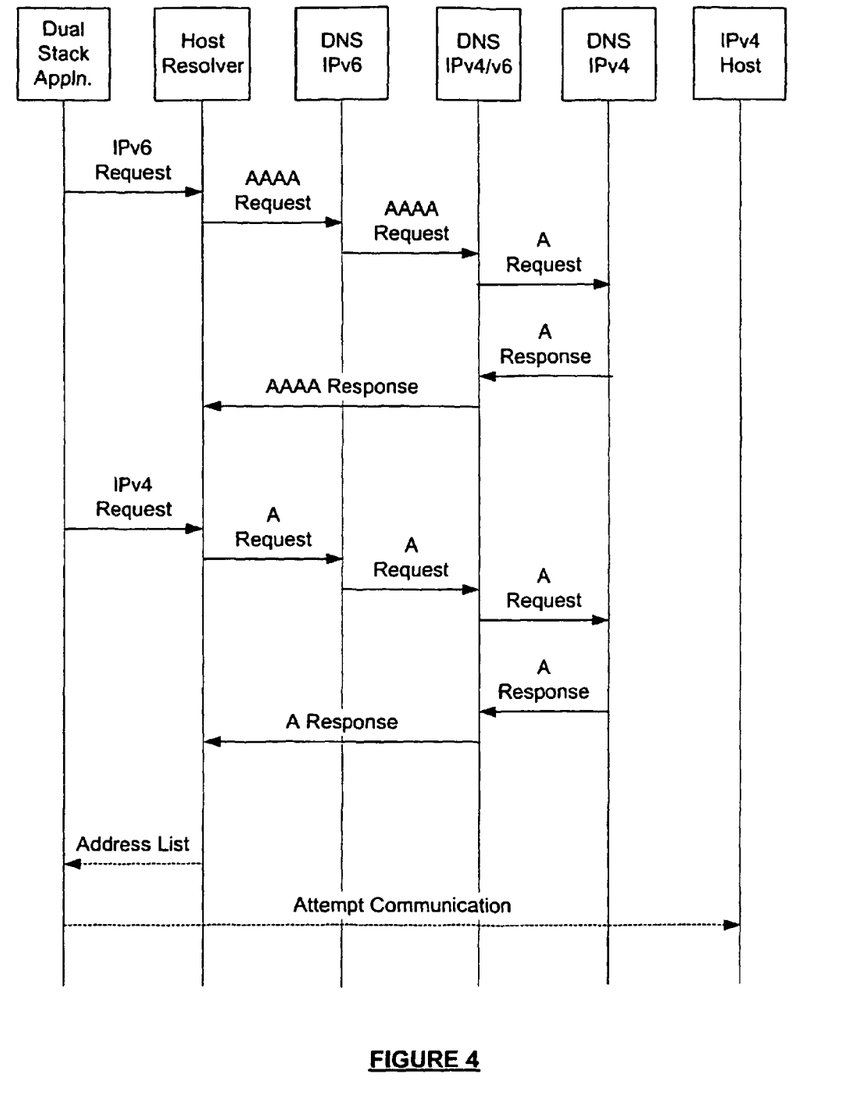

FIG. 4 shows how a dual stack application on the DSTM node system in FIG. 2 may obtain both IPv6 and IPv4 addresses for communication with a target node in an IPv4 network that is also bounded by NAT-PT. For example in FIG. 1, a source node 18 in network 11 may attempt communication with a target node 19 in network 14, or source node 18 in network 12 may attempt communication with a target node 19 in network 13. The application may first request an IPv6 address from the local resolver which in turn sends an AAAA request to the local DNSv6 server 16. The DNSv6 server sends the request on towards a DNSv4 server in the IPv4 network of the target node. The request is translated by a DNSv4/v6 interconnect device, typically a suitable border router such as the DSTM or NAT-PT router itself, into an A request and passed to the DNSv4 server. The DNS server provides an A response that is translated to an AAAA response before being sent back toward the source node in the IPv6 network. A translated address can be detected by the resolver in various ways such as described in relation to FIG. 7.

In FIG. 4, the application in the source IPv6 node then requests an IPv4 address for the target IPv4 node. The local resolver sends an A request to the local DNSv6 server which sends the request on towards a DNSv4 server in the IPv4 network of the target node. The DNS interconnect device relays the request to the DNSv4 server without need of translation and receives an A response in turn. The A response is sent back toward the source node being encapsulated by DSTM on the border of the IPv6 network. The resolver in the IPv6 node collects the AAAA and A responses and provides a list of possible addresses for the dual stack application. The list is ordered by a process in the resolver that generally prefers connectivity by DSTM ahead of connectivity by NAT-PT, and orders the addresses accordingly. More than two addresses may appear in the list depending on a range of circumstances of the source and target nodes. The application in the source node will generally attempt a connection to the target node using the first address on the list, then using second and any lower addresses for further attempts if necessary.

Figure 5:
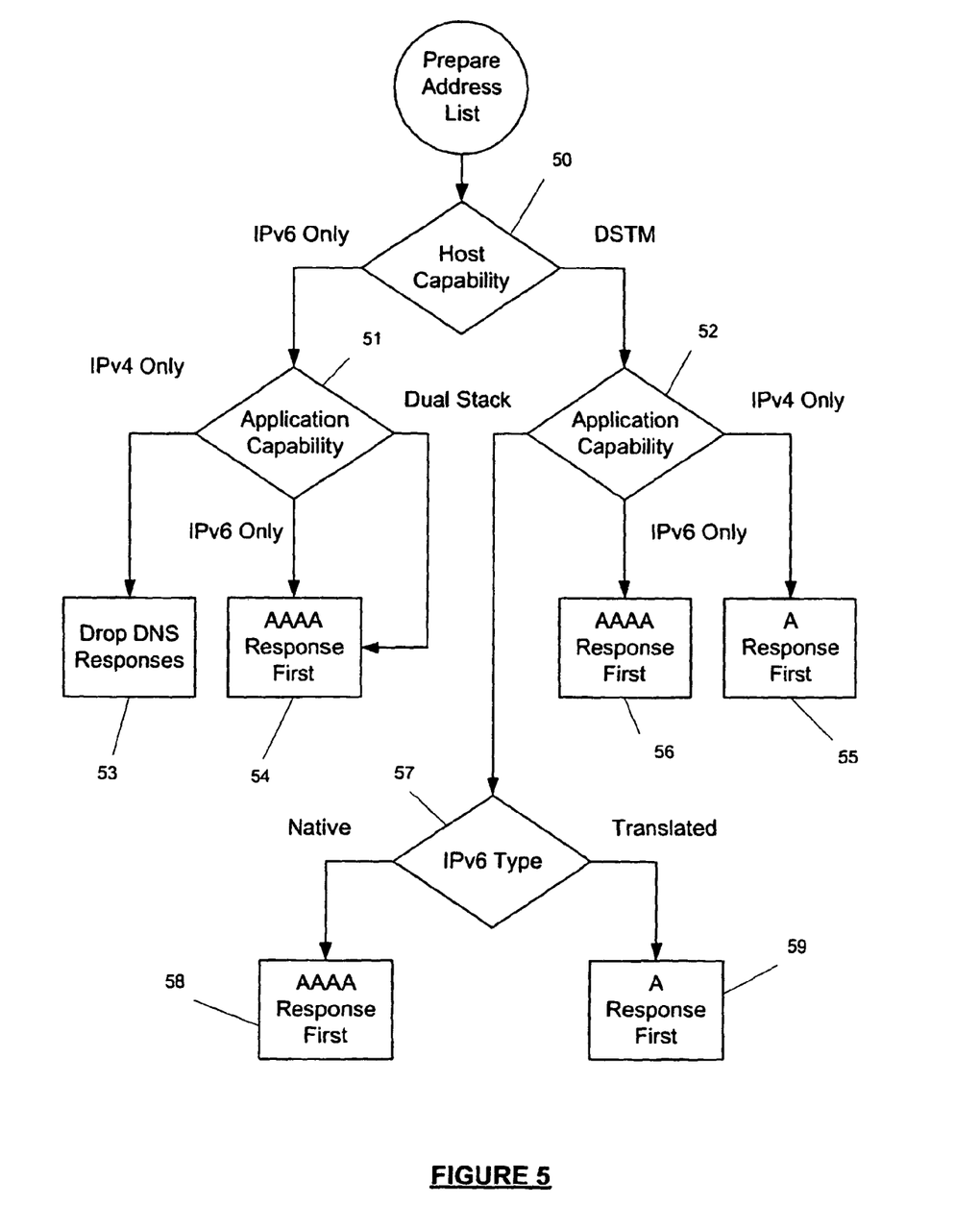

FIG. 5 indicates a possible decision process for step 35 in FIG. 3, by which the resolver 30 can create an address list from a collection of DNS requests and responses, for a range of application and node capabilities. An alternative approach might involve a lookup table. The resolver orders the list according to capabilities of the source node and capabilities of the application for which the list is being created. In this example, the source node is present in an IPv6 network and is seeking to communicate with a target node that may be either IPv4 or IPv6 capable, and bounded by a range of possible transition mechanisms. The source node is either IPv6 capable only, or has access to an encapsulation or tunnelling mechanism, specifically DSTM in this case although other mechanisms exist. A source node in an IPv4 network is not considered. The resolver generally determines the capability of the node by detecting one or more relevant interfaces in the node, or may be specifically provided with relevant data. The application may have IPv4, IPv6 or dual capability depending on a choice made by the developer, installer or operator of the particular software. The resolver generally determines the capability of the application by assessing the range of address requests that are received from the application, or again may be provided with relevant data. A request for an IPv4 address only, an IPv6 address only, or both IPv4 and IPv6 addresses indicates corresponding capability.

In FIG. 5, the resolver has a collection of IPv4 and IPv6 addresses to list in suitable order for an application on the source node. The resolver first determines in decision step 50 whether the node is IPv6 only or DSTM capable, and then in either of decision steps 51 or 52 whether the particular application for which the list is being prepared is IPv4, IPv6 or dual capable. An IPv4 only application on an IPv6 only node cannot communicate with any target node and DNS responses are dropped in step 53. An IPv6 only or dual stack application on an IPv6 only node can communicate only by IPv6 so the AAAA response, whether native from an IPv6 target, or translated from an IPv4 target, is placed first on the list in step 54. An IPv4 only application on a DSTM capable node can only communicate with an IPv4 target node using DSTM, so the A response is placed first in step 55, and the encapsulation mechanism is activated. An IPv6 only application on a DSTM capable node can communicate using either a native or translated address so the AAAA response is therefore placed first in step 56. A dual stack application on a DSTM capable node can communicate with a target node in several ways and an assessment of the IPv6 address is required in decision step 57. Native connectivity is preferred so that for communication with an IPv6 target the AAAA response is placed first in step 58. For communication with an IPv4 node the A response is placed first and the DSTM or other encapsulation mechanism is activated.

Figure 6:
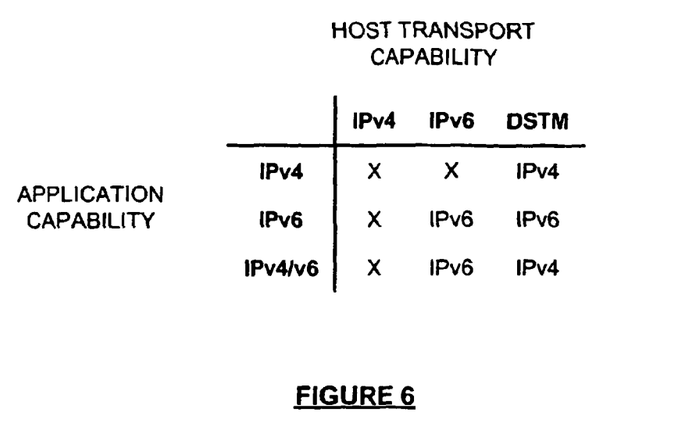
FIG. 6 is a table indicating preferred connectivity for communication of an IPv6 located node with an IPv4 node according to capabilities of the IPv6 node, and FIG. 7 indicates how an IPv6 translated address created by NAT-PT may be identified.

FIG. 6 summarises a special case of the process in FIG. 5 for applications with IPv4, IPv6 and dual stack capabilities, on a source node in an IPv6 network with IPv6 only or DSTM capability, seeking connection with an IPv4 target node. A translation mechanism such as NAT-PT is available so that the most suitable mode of connectivity between the nodes may not always be selected. Circumstances of this kind represent a common problem that will arise as IPv6 networks are implemented on the Internet. An IPv4 capable application can only communicate from a DSTM capable node or a node using some other encapsulation mechanism. An IPv6 application can communicate from IPv6 only or DSTM capable nodes by using translation. A dual stack application can also communicate from either node but uses DSTM and IPv4 where available for native connectivity.

Figure 7:
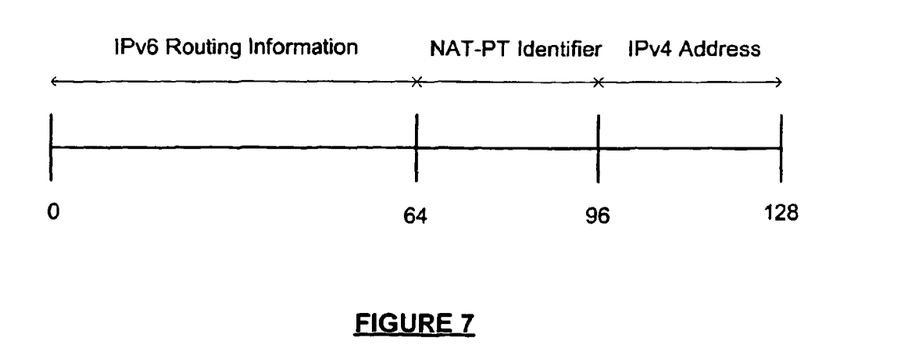

FIG. 7 indicates how IPv6 addresses created by translation of IPv4 addresses may be identified by the resolver. This is one way to differentiate an IPv6 address created by NAT-PT, from a native IPv6 address used by an IPv6 node, and could be used to enable the decision in step 57 of FIG. 5. The lengths of IPv4 and IPv6 addresses are 32 and 128 bits respectively. An IPv4 address is readily contained by an IPv6 address along with a translation identifier, such as a NAT-PT specific identifier. At least 64 bits are normally required for IPv6 routing information leaving 32 bits for the identifier. A translation identifier could be prescribed for all NAT-PT devices so that addresses created by a NAT-PT device can be determined. Each IPv6 node is configured with or discovers the identifiers for translators of one or more kinds.

In FIG. 7 the translator identifier is added by the translator. A possible alternative would be to pre-configure a relevant translator identifier into each IPv4 node. The former is more manageable for large or growing IPv6 networks. The latter preferable for smaller networks.

What is claimed is:

1. A method of selecting connectivity between a source node and a target node in an IP network, said method comprising:
   requesting at least one IP address for the target node,
   receiving two or more IP addresses for the target node,
   determining that one of the received addresses represents connectivity by encapsulation,
   determining that another of the received addresses represents connectivity by translation, and
   selecting the address that represents connectivity by encapsulation for communication between the nodes.

2. A method according to claim 1 further comprising: determining that the source node has a dual stack mechanism available and is capable of connectivity with IPv4 nodes by DSTM.

3. A method according to claim 1 further comprising: requesting both IPv4 and IPv6 addresses for the target node and receiving IPv4 and IPv6 addresses indicating connectivity is possible by DSTM or translation respectively.

4. A method according to claim 1 wherein the source node has dual stack and DSTM capability and the IP network is IPv6 only.

5. A method according to claim 1 wherein an address representing connectivity by translation is determined according to a translation identifier within the address.

6. A method according to claim 1 wherein encapsulation involves DSTM and translation involves NAT-PT.

7. A method according to claim 1 wherein selecting the address representing connectivity by encapsulation includes placing the address first on a list of addresses.

8. A node in an IP network, said node comprising:
   application layer components having different IP addressing capabilities for communication with components in other nodes,
   network layer components providing different IP addressing capabilities for the application layer components, and
   an address resolver component that determines the capabilities of both the application layer components and the network layer components, and selects IP addresses giving preference to encapsulation over translation wherever possible.

9. A node according to claim 8 wherein the address resolver component:
   determines the network layer capabilities by checking for existence of known interfaces within the network layer and
   determines the application layer capabilities by analyzing address requests made by application layer components.

10. An address selector for a node in an IP network, said address selector comprising:
    means for determining IP addressing capabilities of application and network layer components in the node,
    means for determining IP address characteristics of a remote node in the network with which the application components may communicate,
    means for determining a connectivity mechanism according to the capabilities of the components and characteristics of the remote node, and
    means for selecting addresses for the node and the remote node in order to optimize the connectivity mechanism.

11. An address selector according to claim 10 wherein the means for determining IP addressing capabilities of the application and network layer components monitors DNS records and network layer interfaces.

12. An address selector according to claim 10 wherein the means for determining IP address characteristics of the remote node determines a translated IPv4 address for the remote node by way of an identifier in an IPv6 address.

13. An address selector according to claim 10 wherein the means for selecting addresses for the node and the remote node optimises the connectivity mechanism by giving preference to DSTM over NAT-PT mechanisms wherever possible.

14. An address selector according to claim 10 wherein the means for selecting addresses creates ordered lists of addresses for the application layer components.

15. A method of selecting connectivity at a node in an IP network, said method comprising:
    determining capability of the node for communication over the network by way of two or more connectivity mechanisms,
    obtaining two or more IP addresses for another node representing communication between nodes by way of at least two of the mechanisms, and
    selecting an address for each node and a mechanism for communication giving preference to encapsulation over translation where possible.

16. A method according to claim 15 wherein determining capability for a connectivity mechanism includes detecting the presence of one or more dedicated interfaces in network layer components of the node.

17. A method according to claim 15 wherein determining capability for a connectivity mechanism includes detecting capability of one or more application layer components of the node.

18. A method according to claim 15 wherein one of the connectivity mechanisms involves encapsulation by a method such as DSTM and another involves translation by a method such as NAT-PT.

19. A method according to claim 15 wherein determining capability for a connectivity mechanism includes analysing DNS communications when obtaining the IP addresses.

20. A method according to claim 15 further comprising selecting DSTM where the node is DSTM capable and the other node has an IPv4 address.

21. A method according to claim 15 further comprising creating an ordered list of addresses with an encapsulation address ahead of a translation address.

* * * * *